United States Patent
Hayek et al.

(10) Patent No.: US 10,142,669 B2
(45) Date of Patent: Nov. 27, 2018

(54) SYSTEM OF CONNECTED DEVICES

(71) Applicant: THE SWATCH GROUP RESEARCH AND DEVELOPMENT LTD, Marin (CH)

(72) Inventors: Georges Nicolas Hayek, Zurich (CH); Michel Willemin, Preles (CH); Hans-Rudolf Gottier, Safnern (CH); Jean-Luc Bazin, Publier (FR)

(73) Assignee: The Swatch Group Research and Development Ltd, Marin (CH)

( * ) Notice: Subject to any disclaimer, the term of this patent is extended or adjusted under 35 U.S.C. 154(b) by 84 days.

(21) Appl. No.: 15/302,522

(22) PCT Filed: Apr. 8, 2015

(86) PCT No.: PCT/EP2015/057595
§ 371 (c)(1),
(2) Date: Oct. 7, 2016

(87) PCT Pub. No.: WO2015/155223
PCT Pub. Date: Oct. 15, 2015

(65) Prior Publication Data
US 2017/0034561 A1    Feb. 2, 2017

(30) Foreign Application Priority Data
Apr. 8, 2014 (EP) .................. 14163936

(51) Int. Cl.
*H04N 21/41* (2011.01)
*H04N 21/436* (2011.01)
(Continued)

(52) U.S. Cl.
CPC ..... *H04N 21/4126* (2013.01); *H04N 21/4222* (2013.01); *H04N 21/43615* (2013.01);
(Continued)

(58) Field of Classification Search
CPC ............. H04N 21/2225; H04N 21/231; H04N 21/232; H04N 21/47202; H04N 21/436;
(Continued)

(56) References Cited

U.S. PATENT DOCUMENTS

| 5,535,442 A * | 7/1996 | Kishi | H04B 7/082 |
| | | | 455/134.1 |
| 2003/0110502 A1 * | 6/2003 | Creed | H04N 5/4401 |
| | | | 725/86 |

(Continued)

FOREIGN PATENT DOCUMENTS

| CN | 103686329 A | 3/2014 |
| WO | 2008/117105 A1 | 10/2008 |

OTHER PUBLICATIONS

International Search Report dated Jun. 17, 2015 in PCT/EP2015/057595 filed Apr. 8, 2015.

*Primary Examiner* — Robert J Hance
*Assistant Examiner* — Anthony Bantamoi
(74) *Attorney, Agent, or Firm* — Oblon, McClelland, Maier & Neustadt, L.L.P.

(57) ABSTRACT

A set of devices including: at least one receiver and at least one portable device, the receiver including a mechanism receiving a multichannel signal capable of preserving a part of the signal transmitted on a particular channel allowing information to be received, a conversion mechanism associated with a propagation mechanism broadcasting the information, and a communication mechanism; a portable object including an electronic module, the electronic module including at least a calculation unit and a wireless communication circuit to communicate with the communication mechanism of the receiver. The portable object can detect, via the wireless communication circuit, presence of at least one receiver belonging to the set of devices and acting on the at least one receiver to change the particular channel and to (Continued)

select a particular channel whose identifier or whose program currently being broadcast has at least one identifier identical to the identifier programmed in the portable object.

20 Claims, 2 Drawing Sheets

(51) Int. Cl.
  *H04N 21/4363* (2011.01)
  *H04N 21/442* (2011.01)
  *H04N 21/482* (2011.01)
  *H04N 21/422* (2011.01)
(52) U.S. Cl.
  CPC . *H04N 21/43637* (2013.01); *H04N 21/44231* (2013.01); *H04N 21/482* (2013.01)
(58) Field of Classification Search
  CPC ....... H04N 21/43607; H04N 21/43615; H04N 21/43622; H04N 21/4363; H04N 21/43632; H04N 21/43635; H04N 21/43637; H04N 21/4367
  See application file for complete search history.

(56) References Cited

U.S. PATENT DOCUMENTS

| | | |
|---|---|---|
| 2007/0067808 A1 | 3/2007 | Dacosta |
| 2008/0081558 A1 | 4/2008 | Dunko et al. |
| 2008/0134245 A1 | 6/2008 | Dacosta |
| 2008/0134256 A1 | 6/2008 | Dacosta |
| 2011/0138416 A1* | 6/2011 | Kang ............... G06F 3/0482 725/39 |
| 2012/0017250 A1* | 1/2012 | Tirasirikul ............... H04N 7/18 725/85 |
| 2014/0317663 A1* | 10/2014 | Keum ............... H04N 21/4622 725/50 |

* cited by examiner

SYSTEM OF CONNECTED DEVICES

The present invention concerns a set of devices comprising at least one receiver device and at least one portable device, said receiver device comprising means for receiving a multichannel signal capable of preserving a part of the signal transmitted on a particular channel allowing information to be received in the form of a programme, conversion means associated with propagation means for broadcasting said information and communication means, the set of devices further comprising a portable object including an electronic module for the operation of said portable object, the electronic module comprising at least a calculation unit and a wireless communication circuit able to communicate with the communication means of the receiver device.

BACKGROUND OF THE INVENTION

There are known receiver devices such as television receivers or radio receivers that receive video and/or sound information for re-transmission to users. The received signal is transmitted on a frequency band and the receiver device is capable of selecting a precise frequency from within this frequency band. The signals are currently often digital signals. For a television receiver, these different signals correspond to different television channels whereas for a radio receiver, the different signals correspond to different radio stations.

The received information takes the form of a video and/or sound programme.

The user manipulates said receiver device, or uses a dedicated remote control for the device, in order to select the desired channel and thus watch and/or listen to the programme that he wishes.

To improve the use of these receiver devices, the user is able to programme the device with a list of favourites, i.e. to create shortcuts to immediately reach his preferred channels or stations.

However, this only enables the user to go to his preferred channels or stations and not to his preferred programme or type of programme, so that he must always scan all the channels or stations to see whether a programme suits him.

SUMMARY OF THE INVENTION

It is therefore an object of the present invention to overcome the drawbacks of the prior art by providing a set of devices with improved connectivity.

To this end, the present invention concerns a set of devices comprising at least one receiver device and at least one portable device, said receiver device comprising means for receiving a multichannel signal capable of preserving a part of the signal transmitted on a particular channel allowing information to be received in the form of a programme, conversion means associated with propagation means for broadcasting said information and communication means, the set of devices further comprising a portable object including an electronic module for the operation of said portable object, the electronic module comprising at least a calculation unit and a wireless communication circuit able to communicate with the communication means of the receiver device, characterized in that each particular channel and each programme is identified by at least one identifier, the portable object being programmed with at least one specific identifier associated with a particular channel and/or at least one programme and in that the portable object is capable of detecting, via the wireless communication circuit, the presence of at least one receiver device belonging to said set of devices and of acting on said at least one receiver device in order to change the particular channel and to select a particular channel whose identifier or whose programme currently being broadcast has at least one identifier identical to the identifier programmed in the portable object.

In a first advantageous embodiment, the multichannel signal is analogue or digital.

In a second advantageous embodiment, the wireless communication means are provided with at least one interface using at least one protocol.

In a third advantageous embodiment, the wireless communication means are provided with at least two interfaces each using a protocol.

In a fourth advantageous embodiment, the protocols are chosen from the list including: Bluetooth Smart®, WiFi, NFC or other proprietary or standard protocols.

In a fifth advantageous embodiment, said portable object further comprises control means and display means.

In a sixth advantageous embodiment, said portable object is chosen from the list including a watch or a bracelet or a mobile telephone or a smart phone or a remote control or any device able to interact with a receiver device.

BRIEF DESCRIPTION OF THE DRAWINGS

The objects, advantages and features of the device according to the present invention will appear more clearly in the following detailed description of at least one embodiment of the invention, given solely by way of non-limiting example and illustrated by the annexed drawings, in which.

DETAILED DESCRIPTION

Figure 1:
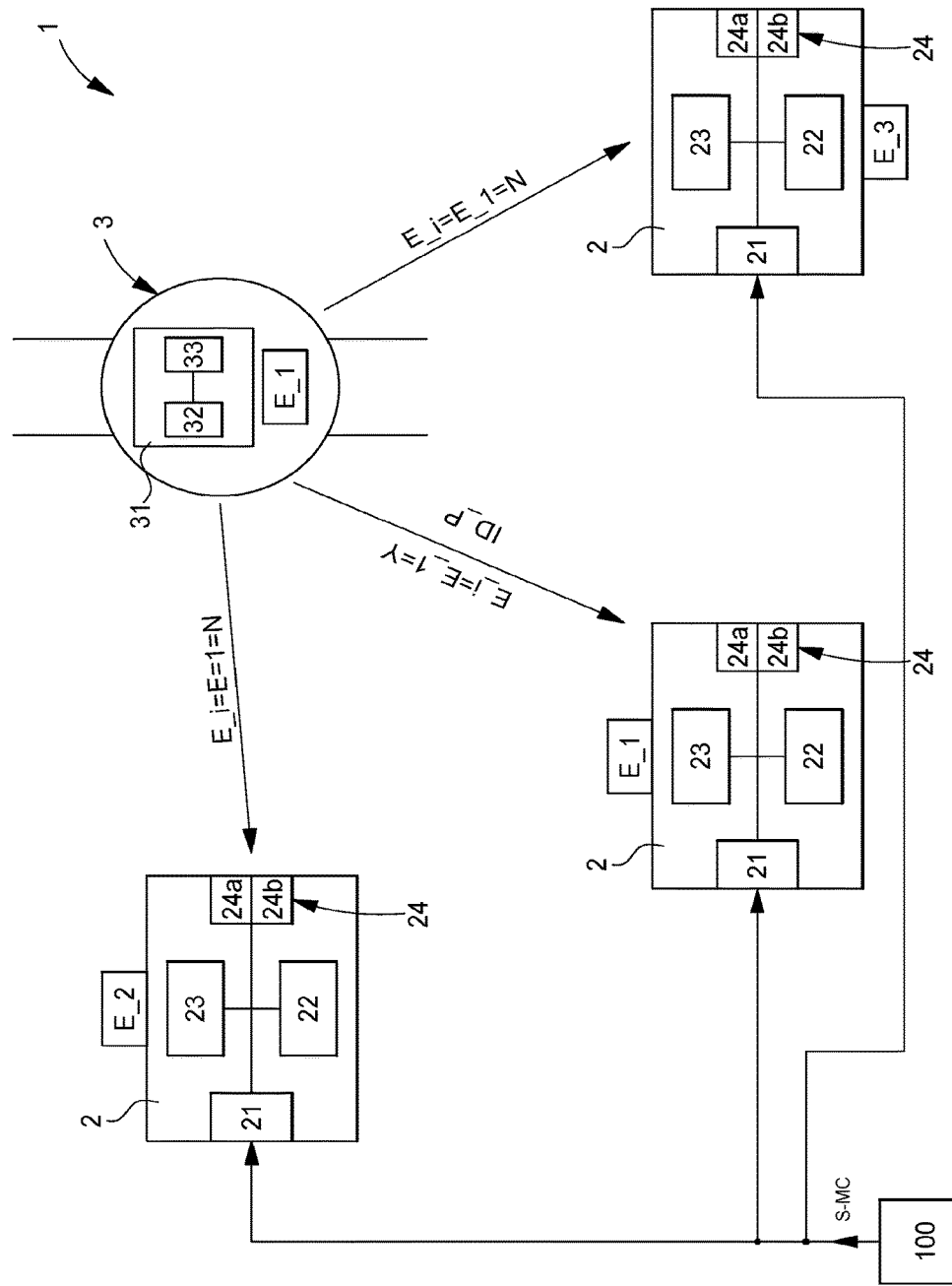
FIGS. 1 and 2 show schematic views of the set of devices according to the present invention.
Figure 2:
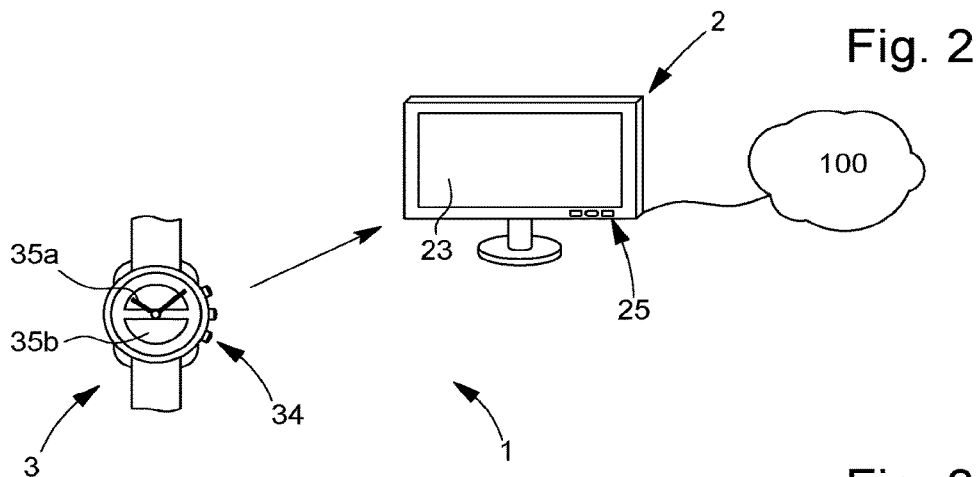

A set of devices 1 according to the present invention is represented in FIGS. 1 and 2. Such a set of devices 1 comprises at least one receiver device 2 and at least one portable object 3.

Receiver device 2 comprises receiver means 21, such as a receiver circuit, capable of receiving a multichannel analogue or digital signal.

In the case of an analogue signal (used in the following description), the multichannel signal (S_MC) is an electromagnetic signal transmitted on a frequency band by a transmitter 100. The receiver device is capable of preserving a part of the signal transmitted on a particular channel, here a particular frequency, and of rejecting the signal parts transmitted on the other frequencies. The electromagnetic signal is transmitted by a transmitter source and may be transmitted in waves or by cables.

Each part of the signal transmitted on a particular frequency allows the user to receive information in the form of a programme. Each particular frequency of the frequency band bears a frequency identifier (ID_Y). Further, each programme bears an identifier (ID_X) associated with the programme. This programme identifier (ID_X) may take the form of a multi-character code. The code comprises several groups of characters each of which provides an indication. These indications may relate to the particular frequency on which the programme is transmitted, the category of the programme, i.e. whether it is sport, entertainment, culture, news, the genre, i.e. the sport genre: football, rugby, car racing, and even more precise information, such as, for example, the type of programme, i.e. whether it is a national championship football match or a European Cup football match or a World Cup football match.

For example, the programme identifier (ID_X) may be encoded in a 12-character code comprising four groups of three characters (for example the identifier X is encoded as follows: AAABBBCCCDDD where AAA corresponds to the channel, BBB corresponds to the category, CCC corresponds to the genre and DDD corresponds to the type), each group (AAA, BBB, CCC, DDD) corresponding to a type of information. These groups of three characters (AAA, BBB, CCC, DDD) may form part of a database.

Receiver device 2 further comprises conversion means 22, such as a demodulator, for converting the selected part of the signal transmitted on a particular frequency into an information signal which will be able to be used by propagation means 23, such as a screen and/or loudspeakers.

It is understood here that receiver device 2 may be a digital or analogue television receiver or a digital or analogue radio receiver or a computer or a touch tablet or any device able to receive, process and convert a multichannel signal for broadcast.

Receiver device 2 further comprises a communication circuit 24 enabling said device 2 to communicate with other devices, communication module 24 comprising a wired communication circuit 24a and/or a wireless communication circuit 24b. The wireless communication circuit is provided with an interface using a protocol selected from among the following list of protocols: Bluetooth Smart®, WiFi, near field communication (NFC) or other proprietary or standard protocols.

Of course, the wireless communication circuit could be provided with several interfaces each using a protocol, or only one interface able to use several different protocols.

Further, receiver device 2 could also includes control means 25.

Portable object 3 comprises an electronic module 31 for the operation of said portable device. This electronic module comprises at least a calculation unit 32 and a wireless communication circuit 33. The wireless communication circuit is provided with an interface using a protocol selected from among the following list of protocols: Bluetooth Smart®, WiFi, near field communication (NFC) or other proprietary or standard protocols.

Of course, the wireless communication circuit could be provided with several interfaces each using a protocol, or only one interface able to use several different protocols.

Electronic module 31 may also comprise display means to allow the user to read information and control means to allow the user to operate the portable object.

For example, the portable object may be a watch or a bracelet or a mobile telephone or a smartphone or a remote control. Portable object 3 is also provided with control means 34, such as push-pieces or touch keys, and may be provided with display means 35. The display means may be used for utilisation of one function or may be used for several functions, and may be hands 35a and/or screens, for example of the LCD type 35b.

Advantageously according to the invention, said at least one receiver device and said at least one portable object of the set of devices each comprise a specific tag (E_i) associated with said set. This specific tag is like an identifier that allows the receiver devices and portable objects to recognise each other via a recognition protocol.

Indeed, portable object 3 is configured such that its electronic module 31 and communication circuit 33 regularly test, within its communication area, for the presence of receiver devices on the basis of the specific tag with a positive reply (Y) or a negative reply (N).

When a test for presence of a receiver device is affirmative, the portable object is configured to interact with the receiver device.

Of course, the test for presence of a receiver device 2 is carried out in an area equivalent to the radius of action of the communication circuit of the portable object. For example, if the Bluetooth Smart® protocol is used, the radius of action will be around 10 m, whereas if NFC is used, the radius of action will instead be around 2 to 30 cm. It will be understood that it is possible to adjust the radius of action of said communication circuit 24, by modifying the components or parameters of communication circuit 24 of portable object 3. This would make it possible, for example, to obtain a communication circuit 24 using the Bluetooth Smart® protocol and having a range of 2 m.

Indeed, advantageously according to the invention, portable object 3 is pre-programmed with an identifier (ID_P) associated with the programmes or with the channel.

Consequently, when portable object 3 is close to a receiver device belonging to set of devices 1, portable object 3 acts on this receiver device by communicating the identifier associated with the programmes or with the channel by sending a signal containing a command.

If the identifier is associated with a programme, the interaction between portable object 3 and receive advice 2 causes a reaction, on the part of receiver device 2, that consists in changing the particular frequency selected and scanning the various frequencies of the electromagnetic signal to select the frequency on which a programme with the same identifier is being broadcast.

For example, the portable object is programmed with an identifier associated with sports programmes and more particularly associated with the genre of football. With the example identifier encoded as follows: AAABBBCCCDDD (where AAA corresponds to the channel, BBB corresponds to the category, CCC corresponds to the genre, and DDD corresponds to the type), the CCC part of the code is the programmed part. When the portable object is close to a receiver device belonging to the set of devices, the programmed code part CCC is communicated to the receiver device which will scan all the particular frequencies to select the particular frequency on which, at the same moment, a sports programme associated with football is being broadcast.

If the identifier is associated with a channel, i.e. with a particular frequency, the interaction between portable object 3 and receiver device 2 causes a reaction, on the part of receiver device 2, that consists in changing the particular frequency by scanning the various frequencies of the electromagnetic signal to select the frequency associated with the programmed identifier. Of course, in the case of a multichannel digital signal, the reaction consists in changing the particular channel by scanning the various channels of the multichannel signal to select the channel associated with the programmed identifier.

The interaction between portable object 3 and receiver device 2 may be automatic, such that the change in frequency of receiver device 2 occurs automatically without external intervention.

However, this interaction may be semi-automatic so that there is a confirmation step in which the user is informed that a compatible receiver device 2, i.e. belonging to the set of devices, has been detected. The user is then asked, via the display means, whether he wishes to interact with this receiver device 2. The user then acts on the control means to confirm or decline interaction.

In a first variant of the invention, there could be a function with an additional identifier which is the device identifier. Indeed, it is possible to envisage portable object 3 being programmed to interact with only one receiver device 2. Consequently, when the user wearing portable object 3 passes close to this particular receiver device 2, portable object 3 interacts therewith, whereas when he passes in proximity to another device 2 of set 1, no interaction occurs.

In a second variant, it is possible to envisage that the identifier associated with the programmes or with the channel and programmed in watch 3, is manually inputted by the user. The user can then select the desired identifier, via an application directly installed in portable object 3 or via an application installed in an object of the smart phone or touch tablet type.

In a third variant, it is possible to envisage several identifiers associated with the programmes or channels being automatically or manually programmed in watch 3. This multitude of identifiers is classified by order of preference. Portable object 3 then acts as follows.

When portable object 3 is close to a receiver device 2 belonging to set of devices 1, portable object 3 acts on this receiver device 2 by communicating the first identifier associated with programmes or with channels on the list. This interaction between portable object 3 and receiver device 2 results in a scan of the various frequencies of the electromagnetic signal to select the particular frequency on which a programme with the same identifier is being broadcast.

However, if at that moment, there is no particular frequency on which a programme with the same identifier is being broadcast, then the portable object sends the second identifier on the list so that the receiver device scans the various frequencies in order to select the particular frequency on which a programme with the second identifier is being broadcast, and so on. The mode of operation is the same, so that if the channel of the first identifier is unavailable for any reason or not desired by the user, then it is the channel of the second identifier on the list that will be selected.

A fourth variant provides for the resolution of different conflicts. Indeed, if several users with a portable object according to the invention are in proximity to a compatible receiver device, it is necessary to know which user takes priority in the selection of the particular frequency.

Figure 3:
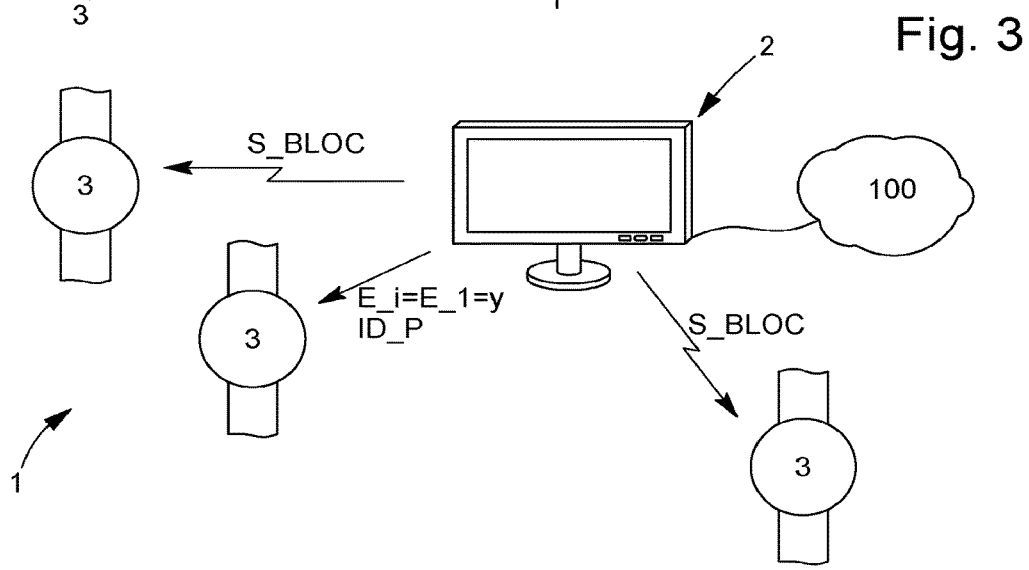
FIGS. 3 and 4 show schematic views of conflict management methods according to the present invention.

To achieve this, a first method, seen in FIG. 3, consists in giving priority to the first user nearby. Receiver device 2 is configured in that case to block interactions with the other portable objects 3 via a blocking signal (S_BLOC).

Figure 4:
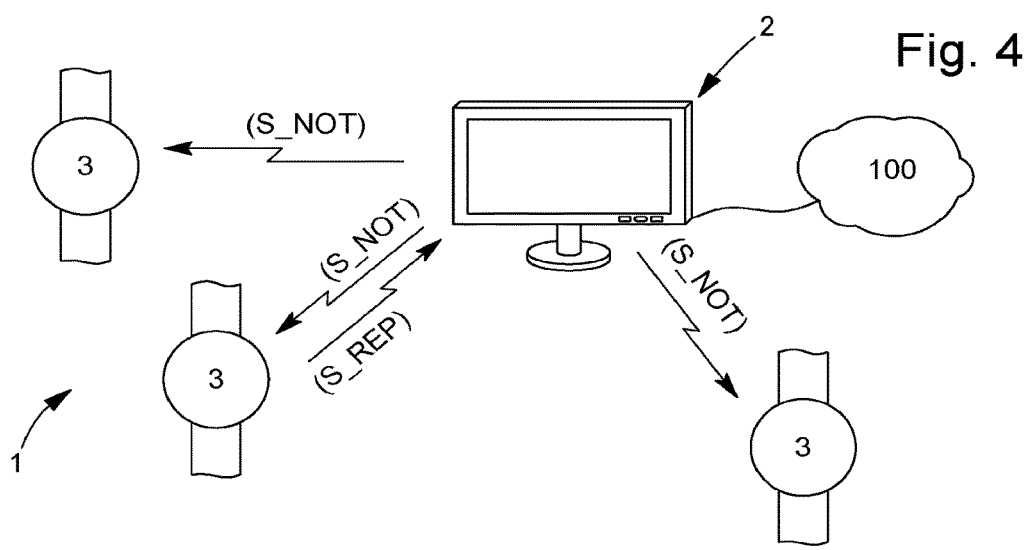

A second method for managing conflicts, seen in FIG. 4, consists in considering that users are not necessarily interested in having their preferred frequency automatically selected in the receiver devices. This second method thus consists in sending notification, via a signal (S_NOT), to all the users indicating that there is a conflict between them. This notification further includes a request for a response that the users must provide via a signal (S_REP) so that the first to respond to the notification will take priority over the others. Any interactions with the other portable objects are then blocked.

Blocking may continue until the particular frequency is changed by a user via commands on the receiver device or via a remote control. It is also possible for blocking to continue whilst the portable object 3 which has priority is nearby. If the user of the portable object 3 that has priority moves, so that receiver device 2 and portable object 3 are out of range of each other, the blocking stops.

In another variant, detection by portable object 3 of a compatible receiver device 2 may occur if said receiver device 2 is in standby mode, i.e. switched on but not active. Thus, when portable object 3 is close to a receiver device 2 belonging to set of devices 1, the portable object acts on the receiver device by sending a command to exit standby mode and change into active mode, while communicating the identifier associated with the desired programmes or channels.

It will be clear that various alterations and/or improvements evident to those skilled in the art may be made to the various embodiments of the invention described in this description without departing from the scope of the invention.

The invention claimed is:

1. A set of devices comprising:
at least one receiver device and at least one portable device, the receiver device includes means for receiving a multichannel signal configured to preserve a part of the signal transmitted on a particular channel allowing information to be received in a form of a program, conversion means associated with propagation means for broadcasting the information, and communication means, the portable device includes an electronic module for operation of the portable device, the electronic module includes at least a wireless communication circuit configured to communicate with the communication means of the receiver device,
wherein the receiver device and the portable device each include a specific tag associated with the set, the specific tag being an electronic source identifier,
wherein each particular program is identified by at least one specific identifier, pre-programmed in the portable device,
wherein the pre-programmed specific identifier includes at least one group of codes, each group of codes being selected by a user and corresponding to a type of information, the type of information includes the channel, a category of the program, a genre, or a type of the program
wherein the portable device is configured to detect, via the wireless communication circuit, presence of at least one receiver device belonging to the set of devices and to transmit a first pre-programmed specific identifier of the at least one pre-programmed specific identifier to the at least one receiver device and in response to receiving the pre-programmed specific identifier, the at least one receiver device searches for a frequency on which the program corresponding to said first pre-programmed specific identifier is being broadcast and, based on this searching, selects said frequency, and
wherein, when there is no frequency on which the program corresponding to the first pre-programmed specific identifier, the at least one receiver device is configured to search for a frequency on which the program corresponding to a second pre-programmed specific identifier of the at least one pre-programmed specific identifiers transmitted by the portable device.

2. The set of devices according to claim 1, wherein the multichannel signal is analog or digital.

3. The set of devices according to claim 1, wherein the wireless communication means includes at least one interface using at least one protocol.

4. The set of devices according to claim 3, wherein the wireless communication means includes at least two interfaces each using a protocol.

5. The set of devices according to claim 4, wherein the protocols are chosen from a set of wireless communication protocols.

6. The set of devices according to claim 1, wherein the portable device further includes control means or display means.

7. The set of devices according to claim 1, wherein the portable device is chosen from a watch or a bracelet or a mobile telephone or a smart phone or a device configured to interact with a receiver device.

8. The set of devices according to claim 1, wherein the searching includes scanning various frequencies of the multichannel signal.

9. The set of devices according to claim 1, wherein the frequency selected by said receiver device and associated with the specific identifier is not pre-programmed.

10. The set of devices according to claim 9, wherein a broadcasting time of the program being broadcasted on said frequency being selected is not pre-programmed.

11. The set of devices according to claim 1, wherein searching by said at least one receiver device is blocked until a frequency is selected by a prioritized signal transmitted to the receiver device.

12. A set of devices comprising:
at least one receiver device and at least one portable device, the receiver device includes means for receiving a multichannel signal configured to preserve a part of the signal transmitted on a particular channel allowing information to be received in a form of a program, conversion means associated with propagation means for broadcasting the information, and communication means the portable device includes an electronic module for operation of the portable device, the electronic module includes at least a wireless communication circuit configured to communicate with the communication means of the receiver device, wherein the receiver device and the portable device each include a specific tag associated with the set, the specific tag being an electronic source identifier, wherein each particular genre of program is identified by at least one specific identifier, manually programmed in the portable device, wherein the manually programmed specific identifier includes at least one group of codes, each group of codes being selected by a user and corresponding to a type of information, and wherein the portable device is configured to detect, via the wireless communication circuit, presence of at least one receiver device belonging to the set of devices and to transmit a first manually programmed specific identifier to at least one receiver device and in response to receiving the first manually programmed specific identifier, the at least one receiver device searches for a frequency on which a program within said genre is being broadcast, and wherein, when there is no frequency on which the program corresponding to the first manually programmed specific identifier, the at least one receiver device is configured to search for a frequency on which the program corresponding to a second manually programmed specific identifier of the at least one manually programmed specific identifiers transmitted by the portable device.

13. The set of devices according to claim 12, wherein the multichannel signal is analog or digital.

14. The set of devices according to claim 12, wherein the wireless communication means includes at least one interface using at least one protocol.

15. The set of devices according to claim 14, wherein the wireless communication means includes at least two interfaces each using a protocol.

16. The set of devices according to claim 15, wherein the protocols are chosen from a set of wireless communication protocols.

17. The set of devices according to claim 12, wherein the portable device further includes control means or display means.

18. The set of devices according to claim 12, wherein the portable device is chosen from a watch or a bracelet or a mobile telephone or a smart phone or a device configured to interact with a receiver device.

19. The set of devices according to claim 12, wherein the frequency selected by said receiver device and associated with the specific identifier is not pre-programmed.

20. The set of devices according to claim 19, wherein a broadcasting time of the program being broadcasted on said frequency being selected is not pre-programmed.

* * * * *